Patented June 10, 1952

2,599,914

UNITED STATES PATENT OFFICE 2,599,914

ETCHING PROCESS

Paul J. Hartsuch, La Grange, and Carl Wachtl, Evanston, Ill., assignors to Lithographic Technical Foundation, Chicago, Ill., a corporation of Delaware No Drawing. Application January 4, 1950, Serial No. 136,846

3 Claims. (Cl. 41—42)

One of the newer developments in lithographic printing surfaces is the bi-metallic plate. Many such plates have been patented, involving a wide variety of metals. One metal serves as the base metal, and the second metal is chemically or electrochemically deposited over the base metal. The second metal may be deposited before the image is produced on the plate. This is called a pre-plated plate. Or the second metal may be applied after the image is produced on the plate. This is called a post-plated plate. The present invention applies particularly to pre-plated plates, although it can be applied to post-plated plates also.

The principle of the bi-metallic plate is that it provides image areas consisting of one metal which is an "ink receptive" metal, such as copper, and non-image areas consisting of a second metal, which is a "water-receptive" metal, such as chromium or certain stainless steels.

The present invention deals with the etching of the chromium from a combination of a base metal, such as copper, and chromium on a lithographic plate. A very thin layer of chromium is ordinarily electroplated onto the copper before the image is applied to the plate. The copper may form the base metal or it may be plated onto a base metal of zinc or stainless steel as in U. S. Patent No. 2,291,854. The latter form of plate is often referred to as a "tri-metal" plate. However, only the copper and the chromium are concerned in the lithographic process.

In the making of such a plate, according to the present state of the art, a light sensitive coating, comprising, for example, gum arabic, ammonium dichromate and ammonia, is applied to the chromium surface. This coating is exposed to a strong arc light through a positive transparency. The image is then developed, by the use of a developer solution, such as one containing a high concentration of calcium chloride to which lactic acid is added. The developer dissolves the gum arabic coating in the image areas, these being the areas which were not exposed to the arc light.

After the plate is developed, the chromium is laid bare in the image areas while the non-image areas are covered with a hardened film of gum arabic, commonly referred to as "the stencil."

Next the plate is treated with a solution called the chromium etch. It is this solution which is the subject of the invention of the present application.

A good chromium etch should do three things: (*a*) it should dissolve the chromium in the image areas exposing the copper underneath; (*b*) it should not attack the exposed copper; and (*c*) it should not dissolve or react chemically with the hardened gum arabic stencil.

Chromium etches in use at present, so far as we are aware, all contain hydrochloric acid as one of the ingredients thereof, together with a high concentration of salts, such as calcium chloride. These etches have certain disadvantages. They give off a considerable quantity of acid vapors and mist during the etching process, which necessitates the use of a special table with adequate ventilation. And they sometimes dissolve part of the gum arabic stencil, and thus allow etching of the chromium in parts of the non-image areas. Also the etches in use at present become exhausted rapidly, necessitating frequent replenishing with fresh portions of the etch.

The chromium etch which we have discovered has a number of advantages over those now in use. One of the main advantages is a great decrease in the amount of acid vapors and mist given off during the etching process, which makes it possible to etch bi-metallic plates of the copper-chromium type without the use of expensive ventilation equipment.

Another important innovation of the present invention is in the amount of etch solution required. Our chromium etch does not exhaust itself easily, and plates can be etched with only one or two applications of the etch.

Furthermore, we have found that our solution dissolves the chromium in a radically different manner than do the present chromium etches. We discovered that after the initial darkening of the chromium, the new chromium etch works much faster in a very thin film than when larger quantities are used. Under these conditions, no evolution of hydrogen gas is observed, it being our belief that oxygen from the air enters into the reaction and is responsible for the oxidizing and dissolving of the chromium.

Another important advantage of our etching solution is that, due to its more rapid action and the use of only a very thin film of the etch, the danger of dissolving the gum arabic stencil is greatly reduced.

Furthermore it has been discovered that this new solution may serve the dual purpose of a developer and an etch, thus eliminating the use of a separate developer solution, as required at present.

It should be added that the use of our solution is not restricted to the production of bi-metallic lithographic plates, but is advantageous whenever a chromium etch is desired, such as in the etching of areas on a chromium-plated gravure cylinder.

This new chromium etch may comprise a mixture of aluminum chloride, zinc chloride and an acid, such as phosphoric acid, nitric acid or hydrochloric acid. Phosphoric acid is the preferred acid, since the fumes are considerably less when it is employed.

An important novel feature of this invention resides in the use of aluminum chloride as the basic element in an etching solution of the type herein described.

Part or all of the zinc chloride may be replaced by other highly soluble salts such as ferric chloride, stannic chloride or lithium chloride, with satisfactory etching of the chromium. Even the acid is not an essential part of the chromium etch if certain combinations of salts are used. Rapid etching of chromium may be obtained with an aluminum chloride-stannic chloride solution, or with an aluminum chloride-zinc chloride-stannic chloride solution.

The limits of concentration of the various ingredients may vary widely, but must be balanced for successful operation.

For example, if 32° Baumé aluminum chloride solution is used as a base, and the Baumé is brought up to 41° Bé. with zinc chloride. successful etches may be made with a phosphoric acid content of about 1 to about 4 fluid ounces per gallon of the aluminum chloride-zinc chloride solution.

If the 32° Baumé aluminum chloride solution is used as a base, and the Baumé is brought up to 55° Bé. with zinc chloride, the amount of acid should be from about 3 to about 9 fluid ounces of phosphoric acid per gallon of the aluminum chloride-zinc chloride solution. However, if the Baumé of the solution is increased to 55° Bé., then the solution will act only as a chromium etch, and not as a combination of developer and etch.

Another successful chromium etch utilizing our invention contains about 16 to about 32 grams of stannic chloride per 100 cc. of 32° Baumé aluminum chloride solution.

Still another successful chromium etch within the purview of the invention contains about 16 to about 32 grams of stannic chloride and about 5 to about 15 grams of zinc chloride per 100 cc. of 32° Baumé aluminum chloride solution.

Other combinations and proportions of ingredients may of course also be employed without departing from the spirit and scope of our invention.

We claim:

1. The process of removing chromium from a chromium plated surface which comprises subjecting the surface to etching by applying thereto a solution containing aluminum chloride as its active ingredient and a salt selected from the group comprising zinc chloride, stannic chloride and ferric chloride as another ingredient.

2. The process of removing chromium from a chromium plated surface which comprises subjecting the surface to etching by applying thereto a solution containing aluminum chloride as its active ingredient, a salt selected from the group comprising zinc chloride, stannic chloride and ferric chloride as a second ingredient, and an acid selected from the group comprising phosphoric acid, nitric acid and hydrochloric acid as a third ingredient.

3. The process of removing chromium from a chromium plated surface which comprises adding aluminum chloride to a solution containing phosphoric acid and subjecting the surface to etching by application of such solution thereto.

PAUL J. HARTSUCH.
CARL WACHTL.

REFERENCES CITED

The following references are of record in the file of this patent:

UNITED STATES PATENTS

| Number | Name | Date |
|---|---|---|
| 1,519,880 | Specketer | Dec. 16, 1924 |
| 2,193,711 | Burnham | Mar. 12, 1940 |

FOREIGN PATENTS

| Number | Country | Date |
|---|---|---|
| 504,559 | Great Britain | Apr. 24, 1939 |